May 17, 1966  R. A. ZUCK ETAL  3,251,445
SPEED RESPONSIVE CLUTCH
Filed March 23, 1962
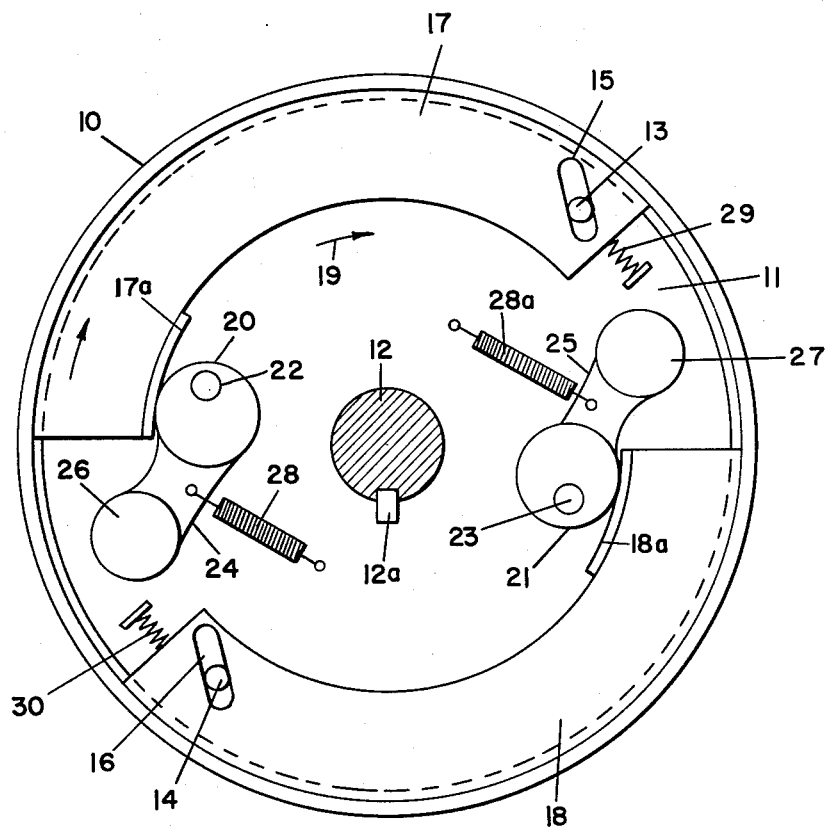
INVENTORS:
RAY A. ZUCK
WINFIELD JOHNSTON
PAUL L. PANZER
BY
*Alfred Stapler*
ATTORNEY 3,251,445
SPEED RESPONSIVE CLUTCH
Ray A. Zuck, Lafayette Hill, Winfield Johnston, Willow Grove, and Paul L. Panzer, Hatboro, Pa., assignors to General Atronics Corporation, Bala-Cynwyd, Pa., a corporation of Pennsylvania
Filed Mar. 23, 1962, Ser. No. 181,963
2 Claims. (Cl. 192—105)

This invention relates to an improved clutch mechanism and particularly to an improved clutch mechanism of the type relying on centrifugal force to provide engagement between driving and driven members.

This type of clutch employs clutch shoes disposed inside a cylindrical drum and curved to conform to the inside curvature of this drum. The shoes are mounted for rotation about an axis aligned with that of the drum. In addition the shoes are capable of moving radially outward from their axis of rotation into engagement with the inner surface of the drum. This outward motion is produced by centrifugal force acting on the shoes during the above-mentioned rotation. Upon engaging the drum the shoes transfer to it their own rotational motion and thereby transmit to the drum the driving power applied to the shoes.

This type of clutch mechanism is capable of engaging very tightly at high rotational speeds, when the centrifugal forces producing engagement between shoes and drum are high, while disengaging at low rotational speeds, when these centrifugal forces are low. Disengagement exists at two stages in the clutch operating cycle, namely when the shoes are first being set into rotational motion, and again when they are being brought to rest.

While tight engagement at high speeds and disengagement before coming to rest are desirable properties in many clutch applications, disengagement during start-up is often an undesirable property.

The inability of prior art efforts to eliminate this latter property of centrifugal clutches by simple, practical means has heretofore substantially restricted the potential utility of such clutches.

Accordingly, it is an object of this invention to provide an improved centrifugal clutch mechanism which engages as soon as rotation commences, without sacrificing to any appreciable degree the properties which such a mechanism has during the remainder of its cycle of operation.

It is another object to provide an improved centrifugal clutch mechanism whose engagement is not subject to appreciable delay beyond the start of rotation of its driving members.

It is still another object to provide an improved centrifugal clutch mechanism in which the shoes which are subject to centrifugal force during rotation of the driving members are brought into tight engagement with the elements of the mechanism to be driven by said shoes at a substantially lower speed of rotation than they would be by centrifugal force alone.

These objects, as well as others which will appear, are achieved in accordance with the invention by associating with the shoes of the clutch mechanism apparatus which utilizes the inertia of these shoes to force them into tight engagement with the clutch elements which are to be driven by them immediately upon initiation of rotation. This apparatus takes the form of an inclined plane, at an acute angle to any radius of the circle of rotation passing through this plane, upon which each shoe slides into engagement with the driven elements.

For further details reference may be had to the accompanying drawing wherein the single figure represents a preferred embodiment of the invention.

This figure shows a clutch mechanism comprising a cylindrical drum 10, which is rotatable about its axis on a shaft (not shown) and constitutes the driven member of the mechanism. Located within cylinder 10 is a circular plate 11, of somewhat smaller diameter than the interior diameter of cylinder 10. Plate 11 is supported by shaft 12 which is keyed to the plate 11 by key 12a. The shaft is coaxial with the axis of rotation of cylinder 10 and is coupled in any conventional manner to the source of motive power for the clutch mechanism. Since this source and coupling may take any number of conventional forms without affecting this invention, they are not discussed herein.

Protruding from plate 11 at diametrically opposed points near its periphery are two pins 13 and 14 which engage, respectively, slots 15 and 16 in shoes 17 and 18. Except for these slots, the shoes 17 and 18 are generally similar to the shoes employed in conventional centrifugal clutches, being characterized by an arcuate outer edge conforming to the interior curvature of cylinder 10.

The slots 15 and 16 are preferably located near those ends of the respective shoes 17 and 18 which constitute their leading ends when the clutch mechanism is set in rotary motion in its intended direction. For purposes of this explanation, this direction is assumed to be clockwise as shown by curved arrow 19 in the figure.

Engaging the trailing ends of these shoes are two cams 20 and 21, respectively. These cams are mounted on plate 11 at diametrically opposed points by means of shafts 22 and 23, respectively, which permit them to rotate in the plane of plate 11. Each cam may be of circular shape, with its pivot located at a distance from the geometrical center of the circle.

Extending outwardly from cams 20 and 21 are extensions 24 and 25, on the ends of which are mounted weights 26 and 27. Springs 28 and 28a, made of wire annealed after winding to resist repeated flexures, are connected between extensions 24 and 25, respectively, and fixed points on plate 11. These springs urge the extensions to which they are attached radially inward with respect to plate 11.

Additional springs 29 and 30 are connected between the leading ends of shoes 17 and 18, respectively, and fixed points on plate 11. These springs urge the shoes circumferentially backward against the direction of rotation of the clutch mechanism.

This mechanism functions as follows.

When it is at rest, the action of springs 29 and 30 not only causes shoes 17 and 18 to be displaced circumferentially in a counterclockwise direction, but also causes them to slide radially outward, into engagement with cylinder 10, because of the inclined plane action of pins 13 and 14 relative to inclined slots 15 and 16, respectively. At the same time springs 28 and 28a, by their radially inward pull on extensions 24 and 25, pivot cams 20 and 21 into angular positions in which they engage bearing surfaces 17a and 18a on shoes 17 and 18 with their shorter radii, whereby these shoes become either completely disengaged from the inner surface of cylinder 10, at their bearing surface ends, or at most are in comparatively light engagement.

When plate 11 is put into rotational motion (in the direction of arrow 19), the inertia of each shoe 17 and 18 will make itself felt as a force acting circumferentially in a direction opposite to the direction of rotation. When applied to the inclined planes formed by the pins 13 and 14 and the slots 15 and 16 in which they are engaged, this force will cause the shoes to slide radially outward with respect to plate 11.

As noted above, the shoes are in engagement with the cylinder even when at rest, due to the action of springs 29 and 30. However, the tightness of this engagement is greatly enhanced by the inertia effect of the shoes themselves, upon commencement of rotation, to the degree that transmission of power to the driven cylinder becomes possible as soon as rotation starts.

This tight engagement will occur virtually immediately upon commencement of rotation, long before the speed of rotation has built up to a value at which equally tight engagement due to centrifugal force would take place.

As the speed of rotation increases, the radially outward forces acting on the shoes also increase. These forces are due not only to the centrifugal force produced by the shoes themselves, but also the force exerted on the shoes by the cams 20 and 21 which are rotated as the weights 26 and 27 swing radially outward under the influence of the centrifugal force produced by these weights. These forces combine to produce intimate engagement between shoes and cylinder.

When the speed next decreases, there will be no tendency due to inertia of the shoes 17 and 18 to force these shoes into engagement with cylinder 10. Accordingly, as the speed decreases to the point at which the centrifugal force is too weak to maintain engagement, there will be no impediment to disengagement other than the pressure of springs 29 and 30, which is not sufficient to prevent the clutch mechanism from being considered as substantially disengaged.

It will be understood that many modifications of this mechanism are possible without departing from the inventive concept.

For example, the number of shoes and associated elements may be varied within wide limits. The springs 28 and 28a need not be the straight coil springs illustrated, but may be spiral springs wound around the pivots 22 and 23, respectively. The springs 29 and 30 may be replaced altogether by other resilient means such as rubber buffers. Additional springs may be added to further bias the shoes away from cylinder 10 when the mechanism is at rest, and so forth.

Accordingly, we desire the scope of the invention to be limited only by the appended claims.

We claim:
1. A clutch mechanism comprising:
a hollow cylinder;
a plurality of clutch shoes disposed circumferentially within said cylinder;
inclined plane means associated with each said shoe and so oriented that said shoe tends to move on said inclined plane radially outward toward said cylinder upon commencement of rotation of said shoes in one direction concentrically with respect to said cylinder;
pivoted weight means rotating together with said shoes and moving radially outward independently of said shoes toward said cylinder in response to the centrifugal force produced by said rotation; and means for transmitting to said shoes a force tending to move them radially outward in response to the said radially outward movement of said pivoted weight means.

2. The mechanism of claim 1 further characterized in that said inclined plane means is positioned at one end of each said shoe and in that said pivoted weight force transmitting means acts upon each said shoe at its opposite end.

References Cited by the Examiner

UNITED STATES PATENTS

| | | | |
|---|---|---|---|
| 1,096,781 | 5/1914 | Erickson | 192—105 |
| 1,453,548 | 5/1923 | Duncombe | 192—41 |
| 1,587,410 | 6/1926 | Pepin | 192—105 |
| 1,967,749 | 7/1934 | Ferguson et al. | 192—103 |
| 1,968,771 | 7/1934 | Tex | 192—41 |
| 2,087,968 | 7/1937 | Dodge | 192—105 |
| 2,127,719 | 8/1938 | Dodge | 192—105 |
| 2,151,950 | 3/1939 | Tyler | 192—105 X |
| 2,373,462 | 4/1945 | Crow | 192—41 |
| 2,869,344 | 1/1959 | Bochan | 192—105 |
| 3,092,227 | 6/1963 | Dossier | 192—41 |

FOREIGN PATENTS

| | | |
|---|---|---|
| 543,708 | 5/1956 | Italy. |
| 355,036 | 7/1961 | Switzerland. |

DAVID J. WILLIAMOWSKY, *Primary Examiner.*

THOMAS J. HICKEY, *Examiner.*

GEORGE H. KRIZMANICH, *Assistant Examiner.*